United States Patent [19]
Bjarsch

[11] 4,213,033
[45] Jul. 15, 1980

[54] ELECTRIC TOASTER

[75] Inventor: Otto Bjarsch, Traunreut, Fed. Rep. of Germany

[73] Assignee: Bosch Siemens Hausgerate GmbH, Stuttgart, Fed. Rep. of Germany

[21] Appl. No.: 915,151

[22] Filed: Jun. 13, 1978

[30] Foreign Application Priority Data

Jun. 13, 1977 [DE] Fed. Rep. of Germany ....... 7718602

[51] Int. Cl.² .............................................. H05B 1/00
[52] U.S. Cl. ..................................... 219/385; 99/385; 99/393; 219/532; 338/304
[58] Field of Search ............... 219/385, 377, 532, 402, 219/403, 408, 409; 99/385, 389, 393; 338/57, 58, 279, 283, 290, 293, 304, 315, 317–319, 305

[56] References Cited
U.S. PATENT DOCUMENTS

| | | | |
|---|---|---|---|
| 1,102,393 | 7/1914 | Denhard | 99/389 |
| 1,130,987 | 3/1915 | Kuhn | 99/393 |
| 1,626,656 | 5/1927 | Woodson | 338/293 |
| 1,753,601 | 4/1930 | Eaton | 99/385 |
| 1,897,879 | 2/1933 | Antrim | 219/403 |
| 2,024,386 | 12/1935 | Phelps | 219/403 |
| 2,548,511 | 4/1951 | Anderson | 219/532 |
| 3,870,863 | 3/1975 | Ohnmacht | 219/532 |
| 3,971,912 | 7/1976 | Kruger et al. | 219/532 |

Primary Examiner—B. A. Reynolds
Assistant Examiner—Bernard Roskoski
Attorney, Agent, or Firm—Herber L. Lerner

[57] ABSTRACT

Electric toaster with a toasting chamber which has heaters on at least two broad sides and is terminated by crosswise walls on two narrow sides, wherein the heaters have insulating parts supporting heater conductors and are supported by the crosswise walls. The crosswise walls have vertical slots or slits and the heaters are placed by inserting the insulating parts of the heater into the slots.

3 Claims, 3 Drawing Figures

ELECTRIC TOASTER

BACKGROUND OF THE INVENTION

1. Field of the Invention

The invention relates to an electric toaster and more particularly refers to a new and improved electric toaster with at least one toasting chamber which has heaters on two broad sides of the chamber and is terminated on two narrow sides by crosswise walls, wherein the heaters have insulating parts supporting heater conductors and the heaters are supported by the crosswise walls.

2. Description of the Prior Art

In one known toaster of this type, the heaters have frames of vertical strips of insulating material and U-sections of sheet metal connecting and spacing the former. The crosswise walls have stamped-out tabs, between which the upper and lower U-sections of the heaters are contained and are fastened by spot-welding.

SUMMARY OF THE INVENTION

An object of the present invention is to provide a toaster of the type described which is simpler in construction, more readily assembled and can be manufactured at reduced costs.

With the foregoing and other objects in view, there is provided in accordance with the invention an electric toaster with a toasting chamber of rectangular-like shape with a length greater than the width, which chamber has a heater extending parallel to each long side of the toasting chamber and which heaters are bounded by crosswise walls on the two narrow sides, with the heaters, composed of insulating parts on which are disposed heater conductors, supported by the crosswise walls, and having the crosswise walls on each narrow side of the toasting chamber with vertical slots into which slots the insulating part at each end of the heater are inserted.

In a specific embodiment of the invention, the heater is of unitary construction having a vertical strip made of insulating material at each narrow side of the toasting chamber, each vertical strip has recesses and legs at its end with the legs extending into the slot of the crosswise wall, heater conductors which engage in the slots and extend between the vertical strips at each narrow side of the toasting chamber, a horizontal, metal member disposed above the heater conductors, connecting the tops of the vertical strips at each narrow side of the toasting chamber, and a horizontal metal member disposed below the heater conductors, connecting the bottoms of the vertical strips at each narrow side of the toasting chamber.

Other features which are considered as characteristic for the invention are set forth in the appended claims.

Although the invention is illustrated and described herein as embodied in an electric toaster, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

The heaters with the parts of insulating material are placed in slots of the crosswise walls. This makes it possible to assemble the heaters simply by plugging them in. Thus the parts of insulating material, which are customarily made of thin sheets or strips of pressed mica, are secured against warping in the area of their edges and can, therefore, be made thinner. This is important since pressed mica is a relatively expensive material.

The insulating material parts advantageously have edge recesses or edge cutouts for receiving turns of heater conductors and the legs protruding in between the recesses are inserted into the slots of the crosswise walls. This construction has the particular advantage that the heater conductors are brought close to the crosswise walls and thus, the toasting chamber is irradiated largely uniformly up to the edge, thereby having a positive effect on producing a unifrom toasting pattern. The heaters can furthermore be of unitary construction with a frame covered with heater conductors, with the frame made of parts of insulating material in the form of strips which support the heater conductors and engage with the slots of the crosswise walls and with horizontal metal strips connecting the insulating strips to each other at the top and bottom of the strips and spacing them. The advantage of protection against warping, mentioned above, is of special importance in this design. The strips of insulating material can thereby be made narrower, which reduces the total heat-storing mass of the heater, which in turn has an advantageous effect on the uniformity of the degree of toasting between a first toasting operation and a second toasting operation following immediately.

Advantageously, the metal legs connecting the insulating strips end at a distance from the slots of the crosswise wall, i.e., the metal legs do not extend into or touch the slots, so that the loosely inserted heaters engage in the slots of the crosswise walls, which customarily consist of sheet metal, only with the relatively soft parts of insulating material, with the result that the thus fabricated toaster makes less noise in the event of movements and, in particular, thermal expansion. In order to fulfill their purpose as stiffeners and guides, the slots of the crosswise walls extend preferably substantially over the entire height of the heaters and are advantageously open at one end so as to make simple plug-in assembly of the heaters possible.

The invention will be explained in greater detail in the following by an embodiment example, making reference to the diagrammatic drawings.

Figure 1:
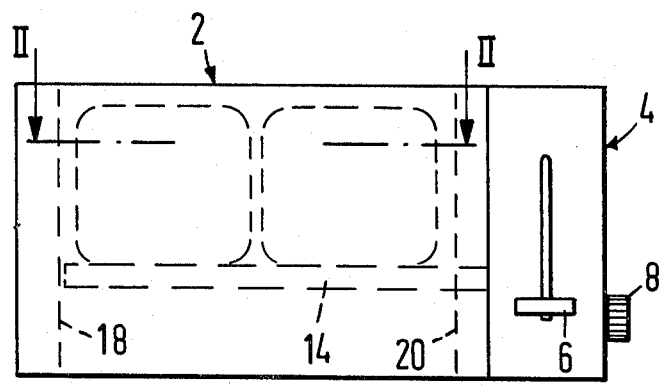
FIG. 1 is a side elevation of a toaster according to the invention.
Figure 2:
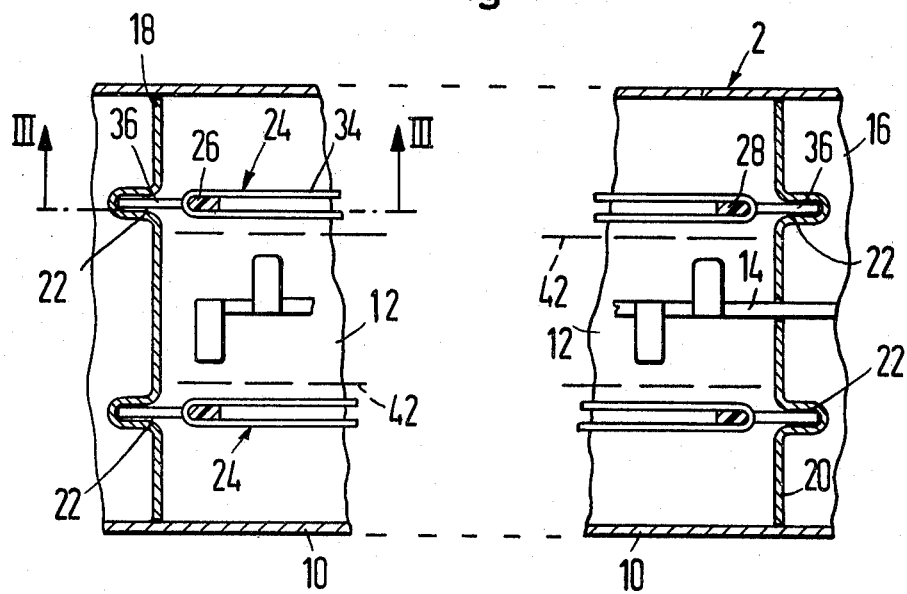
FIG. 2 is a cross section along line II—II in FIG. 1.
Figure 3:
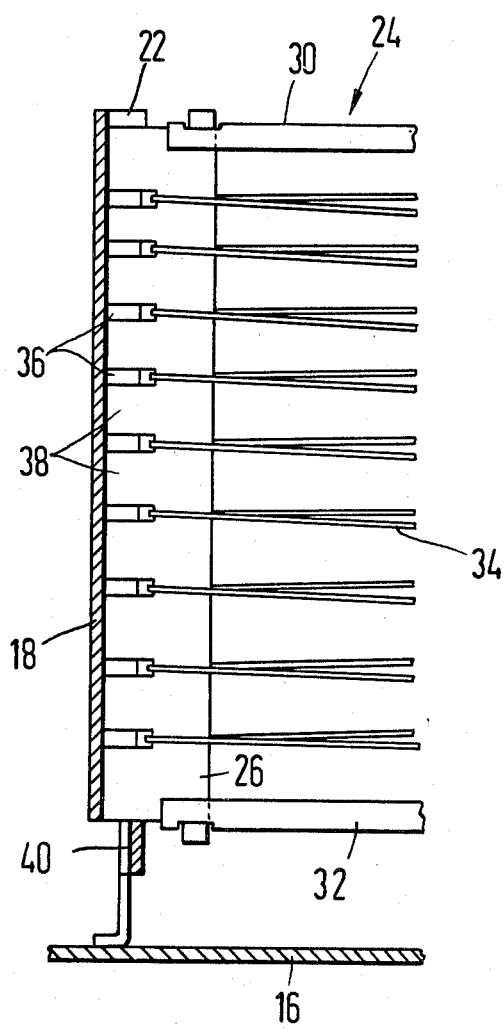
FIG. 3 is a cross section along line III—III in FIG. 2.

The toaster shown in FIGS. 1 to 3 comprises a toasting chamber housing 2 and a control unit 4 with a wind-up lever 6 and a toasting degree control knob 8 built onto the former. The toasting chamber housing 2 has a hood-shaped cover 10 which encloses a toasting chamber 12 for two slides of bread which can be arranged one behind the other and are shown in FIG. 1 as broken lines. The toast rests on a bread carrier 14. Vertical crosswise walls 18 and 20 made of sheet metal with pressed-in vertical slots 22 for receiving heaters 24, are fastened to a base part 16.

As can be seen particularly from FIG. 3, the heaters 24 have a frame formed of vertical strips 26 and 28 of insulating material, which are connected to each other top and bottom by U-section legs 30 and 32 made of sheet metal. A heater conductor ribbon 34 is wound in several horizontal turns on the frame formed in this manner, the individual turns being brought through edge cutouts 36 of the insulating material strips 28 and 26 for fixing their spacing. Between the edge cutouts 36, insulating material legs 38 are left standing, which legs engage in the slots 22 of the crosswise walls. The slots 22 are open toward the top for inserting the heaters 24 and are closed at their lower end by stamped-out tabs 40 of the crosswise walls 18 and 20 extending across them. The heaters 24 are held in place by means of the hood 10 of the toasting chamber housing, but can also be secured against vertical displacement by contact protection screens 42 not shown in detail but indicated in FIG. 2 by broken lines.

The edge cutouts or edge recesses 36 of the insulating material strips 26 and 28 are somewhat deeper in the horizontal direction than the slot 22 of the crosswise wall 18, so that the heater conductors 34 are brought close to the crosswise wall 18 but end at a distance therefrom. The metallic U-sections 30 and 32 of the frame of the heater 24 end at a horizontal distance from the outer edges of the insulating material strips 26, which is likewise larger than the depth of the slot, so that they, too, do not touch the crosswise walls, whereby the development of noise, for instance, due to thermal expansion at the heaters, is avoided to a very high degree.

As the crosswise walls 18 and 20 have a larger dimension in height than the heaters 24, slits 22 extending substantially over the entire height of the heaters can be developed in the crosswise walls. Stamped-out tabs of the crosswise walls consisting of sheet metal can protrude into the region of the slit and be offset away from the toasting chamber so as to serve as a stop for the lateral edge of a heater element. This provides a structure similar to a slot.

There is claimed:

1. In an electric toaster with a toasting chamber of rectangular-like shape with a length greater than the width, which chamber has a heater extending parallel to each long side of the toasting chamber and which heaters are bounded by crosswise walls on the two narrow sides, with the heaters, composed of insulating parts on which are disposed heater conductors, supported by the crosswise walls, the improvement comprising, having the crosswise walls on each narrow side of the toasting chamber with vertical slots, the heater being of unitary construction having a vertical strip made of insulating material at each narrow side of the toasting chamber, each vertical strip having recesses and legs at its end with the legs extending into the slot of the crosswise wall, said recesses being deeper than said slots, heater conductors which engage in the recesses out of contact with the crosswise wall and extend between the vertical strips at each narrow side of the toasting chamber, a horizontal, metal member disposed above the heater conductors, connecting the top of the vertical strips at each narrow side of the toasting chamber, a horizontal metal member disposed below the heater conductors, connecting the bottoms of the vertical strips at each narrow side of the toasting chamber, the horizontal metal members ending at a distance from the slots of the crosswise walls.

2. Electric toaster according to claim 1, wherein the slots of the crosswise walls extend substantially over the entire height of the heaters.

3. Electric toaster according to claim 1, wherein the slots of the crosswise walls are open at one end.

* * * * *